United States Patent
Ader

(10) Patent No.: US 11,523,370 B1
(45) Date of Patent: Dec. 6, 2022

(54) EFFICIENT GRAPHICS PROCESSING UNIT (GPU) PULSE DETECTOR

(71) Applicant: BAE Systems Information and Electronic Systems Integration Inc., Nashua, NH (US)

(72) Inventor: Joseph E. Ader, Brookline, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 89 days.

(21) Appl. No.: 17/328,544

(22) Filed: May 24, 2021

Related U.S. Application Data

(60) Provisional application No. 63/029,005, filed on May 22, 2020.

(51) Int. Cl.
| | |
|---|---|
| H04W 72/00 | (2009.01) |
| H04W 84/02 | (2009.01) |
| H04W 72/12 | (2009.01) |
| H04W 72/04 | (2009.01) |

(52) U.S. Cl.
CPC ..... H04W 72/005 (2013.01); H04W 72/0453 (2013.01); H04W 72/1226 (2013.01); H04W 84/02 (2013.01)

(58) Field of Classification Search
CPC ........... H04W 72/005; H04W 72/0453; H04W 72/1226; H04W 84/02; H04W 28/16; H04W 72/00; H04W 36/0094
See application file for complete search history.

(56) References Cited

U.S. PATENT DOCUMENTS

| | | | |
|---|---|---|---|
| 2004/0029622 A1* | 2/2004 | Laroia | H04W 72/048 455/574 |
| 2016/0119806 A1* | 4/2016 | Carbajal | H04B 17/27 455/67.11 |
| 2017/0041085 A1* | 2/2017 | Kwon | H04L 25/02 |

OTHER PUBLICATIONS

Belloch, Guy E., Programming Parallel Algorithms, Communications of the ACM, vol. 39, No. 3, Mar. 1996, pp. 85-97.
(Continued)

*Primary Examiner* — Ian N Moore
*Assistant Examiner* — Latresa A McCallum
(74) *Attorney, Agent, or Firm* — Scott J. Asmus; Finch & Maloney PLLC

(57) ABSTRACT

Methods and structures are disclosed for using a graphics processing unit (GPU) to detect and organize pulses in an efficient, parallel manner. A received signal is divided into a plurality of sub-batches. Each of the plurality of sub-batches is processed in parallel by detecting a number of pulses present within each of the plurality of sub-batches. A scanning algorithm process for combining the pulse information of the detected pulses includes providing pulse information from detected pulses within a plurality of subgroups with each subgroup including $2^n$ sub-batches, with n equal to a number of iterations of performing the providing, and repeating the iterations, increasing n by 1 for each iteration, until $2^n$ is equal to the total number of sub-batches in the plurality of sub-batches. An output array is generated having a size based on a total combined pulse count and including sequential pulses from the plurality of sub-batches.

20 Claims, 9 Drawing Sheets

(56) References Cited

OTHER PUBLICATIONS

Belloch, Guy E., Prefix Sums and Their Applications, School of Computer Science, Carnegie Mellon University, Chapter 1, CMU-CS-90-190, Nov. 1990, pp. 35-60.

* cited by examiner

US 11,523,370 B1

EFFICIENT GRAPHICS PROCESSING UNIT (GPU) PULSE DETECTOR

CROSS-REFERENCE TO RELATED APPLICATIONS

This application claims the benefit of U.S. Provisional Patent Application No. 63/029,005, filed May 22, 2020, which is incorporated by reference herein in its entirety.

BACKGROUND

Many signal intelligence systems rely on data streams from tuners that produce digital samples to feed digital signal processing applications. Such applications may include radar warning systems, identification friend-or-foe (IFF) systems, and general radio frequency (RF) communication systems. Signal pulses from these data streams are identified and coalesced to provide a condensed output data stream that contains only the portions of interest from the original received data stream. One way to identify the pulses in the data stream is to break up the data stream into smaller portions and work on each portion in parallel using a processing unit like a graphics processing unit (GPU) that can operate on many threads simultaneously. As will be appreciated, a number of non-trivial issues remain with respect to leveraging the processing power of the GPU to provide more efficient signal processing.

Figure 1:
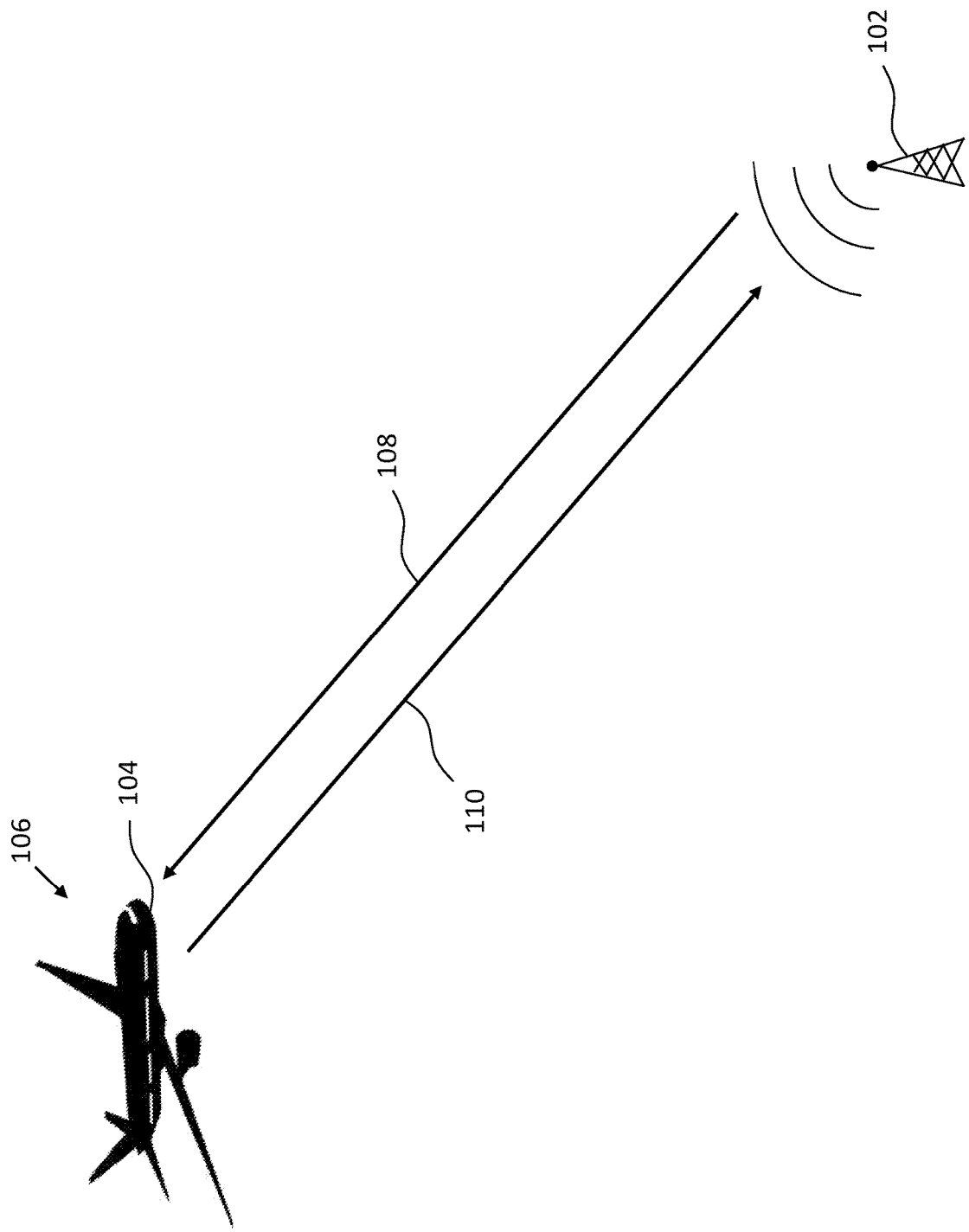
FIG. 1 is a schematic diagram of an example use case in which an identification friend or foe (IFF) interrogator system and an IFF transponder system are employed, in accordance with an embodiment of the present disclosure.

These and other features of the present embodiments will be understood better by reading the following detailed description, taken together with the figures herein described.

DETAILED DESCRIPTION

Methods and structures are disclosed for using a graphics processing unit (GPU) to perform signal pulse detection and organizing in an efficient, parallel manner. According to an embodiment, multiple processing threads of the GPU can be used to process sub-batches of a signal (e.g., different temporal portions of the signal) in parallel and identify signal pulses within each of the sub-batches. Detecting and arranging all of the pulses across the sub-batches can be further streamlined using a scanning algorithm to combine pulse information and use the information to index the pulse positions within an output array. According to an embodiment, the process of determining a number of pulses in a received signal includes dividing up the received signal into a plurality of sub-batches. Each of the plurality of sub-batches represents a different temporal portion of the received signal. The temporal portions may be sequentially adjacent in time. In some embodiments, the received signal may be channelized into one or more frequency bins, with each frequency bin being divided up into a plurality of sub-batches. Each of the plurality of sub-batches is processed in parallel by detecting a number of pulses present within each of the plurality of sub-batches. Each of the detected pulses is characterized as having detected pulse information. The detected pulse information of the detected pulses from the plurality of sub-batches is combined. The scanning algorithm process for combining the detected pulse information includes providing combined information on a number of detected pulses within a plurality of subgroups with each subgroup including $2^n$ sub-batches, with n equal to a number of iterations of performing the detecting, and repeating the iterations, increasing n by 1 for each iteration, until $2^n$ is equal to the total number of sub-batches in the plurality of sub-batches. In this way, information from pulses across successively larger numbers of sub-batches are detected and combined quicker than if the sub-batches were analyzed sequentially. The method also generates an output array having a size based on a total combined pulse count derived from the combined detected pulse information from the plurality of sub-batches and including sequential pulses from the plurality of sub-batches. The output array may be used by the GPU or any other processing unit to read the pulse data.

General Overview

As previously noted, there a number of non-trivial issues that remain with respect to implementing a GPU-based detector. For example, while GPUs excel at parallel processing by breaking work up into blocks of multiple threads each, computations are performed independent of one another with little to no coordination between the computations. This can result in a lot of serial computations being performed, especially for detection-based applications where portions of a signal are detected (e.g., signal pulses) and counted across the various threads. Determining the total pulse count and placing the pulses into an output vector devolves into a serial process of adding the pulses from successive threads to determine where to place the pulses within the output vector. Although such a method can work to produce the output vector of detected pulses, it does not make efficient use of the parallel processing power of the GPU.

Thus, and in accordance with an embodiment of the present disclosure, techniques are disclosed for detecting pulses from a received radio frequency (RF) signal in a more efficient way by leveraging the parallel processing power of a GPU. The RF signal can be received and digitized as a signal batch having a certain time duration and temporally divided into a plurality of sub-batches to be processed in parallel by different threads of the GPU. For example, a signal batch may have a length in the millisecond range while each processing thread works on a sub-batch in the microsecond range. Rather than build an output vector by sequentially detecting pulses found in each sub-batch, a scan algorithm is employed that sweeps through the total number of sub-batches in strides of powers of 2 to reduce the number of steps required to detect pulses from each sub-batch. Accordingly, the scan algorithm may be used to determine a total number of detected pulses having a log(N) efficiency with N being the total number of sub-batches.

In some embodiments, pulse counts between sub-batches are adjusted based on whether one or more signal pulses extend across any number of boundaries between two or more sub-batches. Furthermore, determining whether or not a portion of the signal within a given sub-batch should be categorized as a pulse may be affected by the signal characteristics at one or both boundaries of the given sub-batch. In general, a pulse may be defined as having a pulse-start time and a pulse-end time where an amplitude of the RF signal at the pulse-start time raises above a first threshold and an amplitude of the RF signal at the pulse-end time lowers below a second threshold different from the first threshold. Although signal amplitude is used as one example for determining pulse start and end times, other signal characteristics or combinations of more than one signal characteristic may be used for determining pulse start and end times.

In more detail, and in accordance with an embodiment, a processor-implemented method for detecting pulses in a received signal includes dividing the signal into a plurality of sub-batches; processing each of the plurality of sub-batches in parallel; combining detected pulse information from the plurality of sub-batches; and generating an output array having a size based on a total number of detected pulses derived from the combined detected pulse information from the plurality of sub-batches and including sequential pulses from the plurality of sub-batches. Each of the plurality of sub-batches represents a different temporal portion of the received signal. Processing each of the sub-batches includes detecting a number of pulses present within each of the plurality of sub-batches where each of the detected pulses is characterized as having detected pulse information. The operation of combining detected pulse information includes providing combined information on a number of detected pulses within a plurality of subgroups, each subgroup including $2^n$ sub-batches, with n equal to a number of iterations of performing the detecting. The procedure for providing the combined information on a number of detected pulses is repeated, increasing n by 1 for each iteration, until $2^n$ is equal to the total number of sub-batches in the plurality of sub-batches. The method can also involve splitting the total number of detected pulses back into the detected pulses from each of the plurality of sub-batches along with an index value for each of the plurality of sub-batches. The index value represents the location within an output array to begin storing the detected pulses for a given sub-batch and ensures that the pulses are stored sequentially within the output array.

According to another example embodiment, a system designed to detect pulses in a received signal includes one or more non-transitory machine-readable mediums configured to store instructions and one or more processors configured to execute the instructions stored on the one or more non-transitory machine-readable mediums. In some embodiments, the one or more processors includes one or more GPUs. The instructions cause the one or more processors to divide the received signal into a plurality of sub-batches; process each of the plurality of sub-batches in parallel; combine detected pulse information from the plurality of sub-batches; and generate an output array having a size based on a total number of detected pulses derived from the combined detected pulse information from the plurality of sub-batches and including sequential pulses from the plurality of sub-batches. Each of the plurality of sub-batches represents a different temporal portion of the received signal. Processing each of the sub-batches includes detecting a number of pulses present within each of the plurality of sub-batches where each of the detected pulses is characterized as having detected pulse information. The operation of combining detected pulse information includes providing combined information on a number of detected pulses within a plurality of subgroups, each subgroup including $2^n$ sub-batches, with n equal to a number of iterations of performing the detecting. The procedure is repeated, increasing n by 1 for each iteration, until $2^n$ is equal to the total number of sub-batches in the plurality of sub-batches.

According to another example embodiment, a computer program product includes one or more non-transitory machine-readable mediums encoding instructions that when executed by one or more processors cause a process to be carried out for detecting pulses in a received signal. The process includes similar operations to those described in the processor-implemented method above.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

System Architecture

FIG. 1 is a schematic diagram of an example use case where pulse detection from a received RF signal may be utilized, in which an identification friend or foe (IFF) interrogator system 102 communicates with an IFF transponder system 104, in accordance with an embodiment of the present disclosure. As shown, and in this example use case, IFF interrogator system 102 is configured and operable to interrogate a region of interest in search of complementary IFF transponder system 104 onboard or otherwise integrated with an aerial platform 106 (e.g., IFF transponders of friendly forces) located in the region of interest. To do so, IFF interrogator system 102 transmits or otherwise sends interrogation signals 108 (requests or challenges) for receipt by complementary IFF transponder system 104 onboard aerial platform 106. Interrogation signals 108 may include any number of signal pulses at one or more different frequencies. IFF transponder system 104 receives interrogating signals 108, decodes the information from the signal pulses of the received RF signal, and transmits or otherwise responds with reply signals 110. Correct or appropriate reply signals 110 can allow IFF interrogator system 102 to determine the identity of aerial platform 106, and possibly determine that aerial platform 106 is friendly. The depiction of IFF interrogator system 102 as a ground facility or platform and aerial platform 106 as an aircraft is merely for explaining the operations in one example. The IFF interrogator system 102 can be ground based, maritime based, air based, or space based. Likewise, the platform equipped with the IFF transponder system 104 can be ground based, maritime based, air based, or space based.

Figure 2:
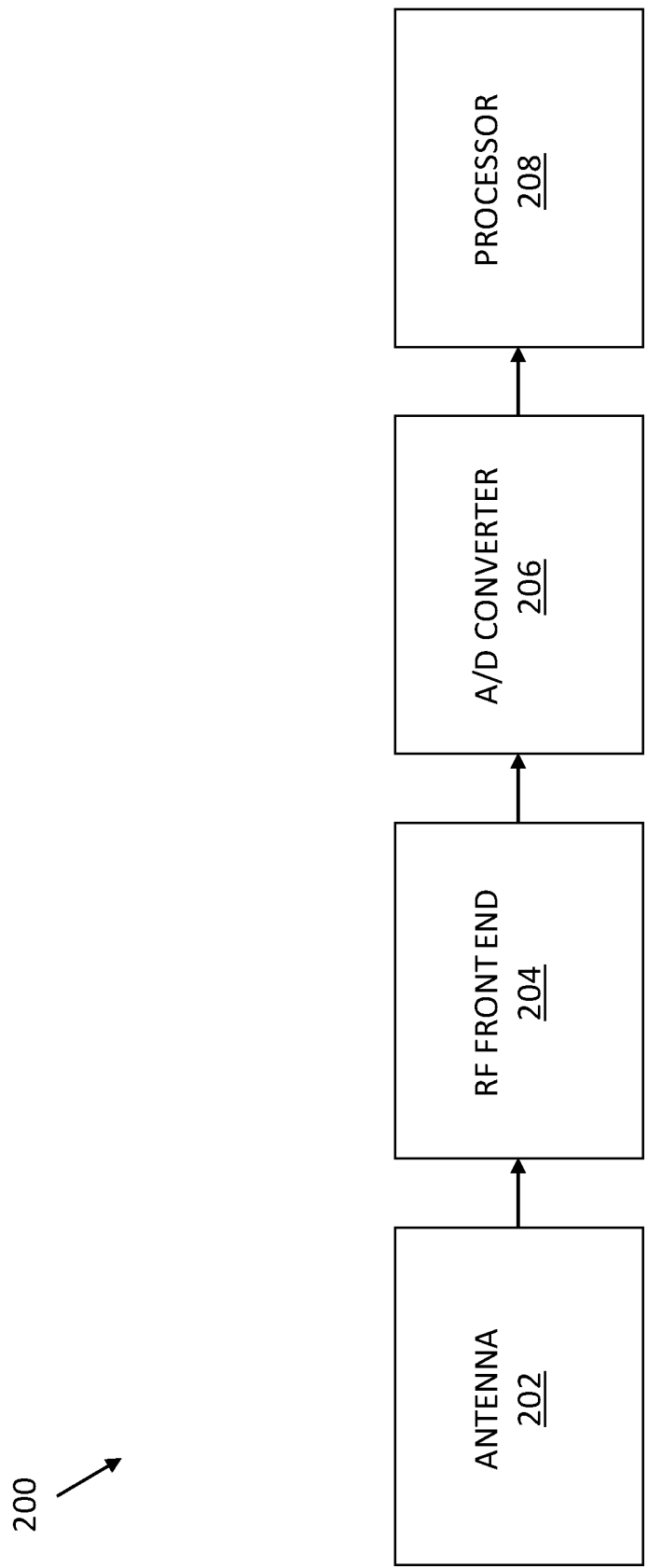
FIG. 2 is a block diagram illustrating a signal processing environment, in accordance with some embodiments of the present disclosure.

FIG. 2 illustrates an example RF receiver (or transceiver) 200, according to an embodiment. RF receiver 200 includes an antenna 202, RF front end circuitry 204, an analog-to-digital converter (ADC) 206, and a processor 208. In some cases, RF receiver 200 is implanted as a system-on-chip, or a chip set populated on a printed circuit board (PCB) which may in turn be populated into a chassis of a multi-chassis system or an otherwise higher-level system, although any number of implementations can be used. RF receiver 200 may be one portion of an electronic device that sends and/or receives RF signals.

Antenna 202 may include one or more patch antennas or microstrip antennas, according to some embodiments. Any number of antennas may be included in antenna 202. In some embodiments, antenna 202 may include one or more antennas to support multiple communication bands (e.g., dual band operation or tri-band operation). For example, some of the antennas may support tri-band operation at 28 GHz, 39 GHz, and 60 GHz. Various ones of the antennas may support tri-band operation at 24.5 GHz to 29 GHz, 37 GHz to 43 GHz, and 57 GHz to 71 GHz. Various ones of the antennas may support 5G communications and 60 GHz communications. Various ones of the antennas may support 28 GHz and 39 GHz communications. Various ones of the antennas may support millimeter wave communications. Various ones of the antennas may support high band frequencies and low band frequencies. In a more general sense, antenna 202 may be any number of antenna types and configurations suitable for receiving (and possibly transmitting) desired communication signals, as will be appreciated.

RF front end circuitry 204 may include various components that are designed to filter, amplify, and tune selected portions of a received RF signal, according to an embodiment. RF front end circuitry may be designed to have a high dynamic range that can tune across a wide bandwidth of frequencies. For example, RF front end circuitry 204 may include components that are capable of tuning to particular frequency ranges within a signal having a bandwidth in the gigahertz range, such as bandwidths between 5 GHz and 50 GHz. In some embodiments, RF front end circuitry 204 includes one or more integrated circuit (IC) chips packaged together in a System-In-Package (SIP).

ADC 206 may be implemented to receive a filtered, amplified RF signal from RF front end circuitry and to convert the signal into a digital signal for further processing (e.g., pulse counting and coalescing). ADC 206 may be any known type of ADC without limitation. In some embodiments, ADC 206 has a linear range of between about 6 GHz and about 10 GHz, and the output resolution is in the range of 6 to 12 bits, although the present disclosure is not intended to be limited to such specific implementation details.

Processor 208 may be configured to receive the digitized signal and perform any number of operations with the signal. For example, processor 208 may look for particular patterns or signatures in the received digital signal, such as detection of signal pulses within the received digital signal. As used herein, the term "processor" may refer to any device or portion of a device that processes electronic data from registers and/or memory to transform that electronic data into other electronic data that may be stored in registers and/or memory. Processor 208 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, custom-built semiconductor, or any other suitable processing devices. In accordance with some embodiments, processor 108 is a GPU designed to work on sub-batches of the received digitized signal in parallel.

Pulse Detection Technique

Figure 3:
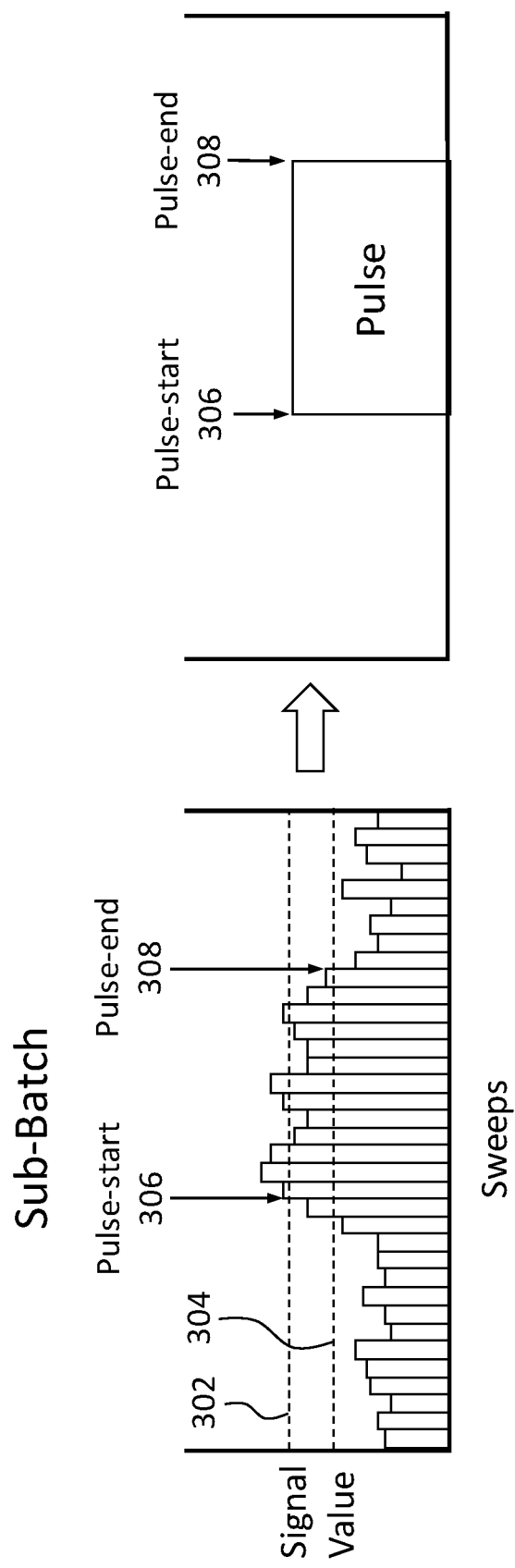
FIG. 3 illustrates an example of pulse detection in a given signal sub-batch, in accordance with an embodiment of the present disclosure.

FIG. 3 illustrates an example of pulse detection from within one sub-batch of the received digital signal, according to an embodiment. Recall that the received digital signal is chopped up temporally into a plurality of adjacent sub-batches. In some embodiments, the received digital signal is first channelized into multiple frequency bins, with each frequency bin being further chopped up temporally into the plurality of adjacent sub-batches. Each sweep corresponds to the averaged amplitude of the signal over a given time period. For example, each sweep may correspond to a moving average of the RF signal over a nanosecond range with the height of the bar corresponding to the average signal amplitude over that time period. Although signal amplitude is used as one example for measuring the signal for each sweep, other signal characteristics or combinations of more than one signal characteristic may be used.

According to an embodiment, one or more signal thresholds are used to determine the locations of the signal pulses within a given sub-batch. For example, a first signal threshold 302 may be used to determine a pulse-start time (such as pulse-start time 306) while a second signal threshold 304 may be used to determine a pulse-end time (such as pulse end-time 308). When the signal value of any sweep raises above first signal threshold 302 (e.g. the signal value of the previous sweep was below first signal threshold 302) then a pulse-start time is identified at that sweep. The duration of the pulse from that pulse-start time continues until the signal value of any subsequent sweep lowers below second signal threshold 304 (e.g. the signal value of the previous sweep was above second signal threshold 304) signifying the pulse-end time. Since first signal threshold 302 is greater than second signal threshold 304, the signal values of the sweeps between the identified pulse-start time and pulse-end time can change and even be less than first signal threshold 302 so long as they do not fall lower than second signal threshold 304. The allowed hysteresis in the pulse detection provides some wriggle room to protect against signal or environmental noise causing the detector to prematurely stop identifying a signal pulse.

The difference between first signal threshold 302 and second signal threshold 304 may be adjusted either manually or automatically by the GPU to change the sensitivity of the pulse detection, according to some embodiments. The thresholds themselves and/or the distance between the two thresholds may be adjusted by a user based on the characteristics of the signal of interest. For example, thresholds may be set differently based on expected noise levels and/or average signal amplitudes. Some applications may require stricter tolerance to false-alarm pulses (e.g., in particularly noisy situations), which may prompt a user to manually set higher threshold values to avoid the noise. In some embodiments, the signal of interest may be observed over some period of time and thresholds may be set automatically to provide a highest probability of correctly identifying the pulses based on any number of signal processing techniques, such as envelope detection, moving averages, etc.

The signal between any pulse-start time and its following pulse-end time is counted as a single pulse. Any number of pulses can be identified within a given sub-batch. Pulses cannot overlap since there cannot be a pulse-start time proceeded by another pulse-start time without any pulse-end times between them. Similarly, there cannot be a pulse-end time proceeded by another pulse-end time without any pulse-start times between them. In some embodiments, a pulse-start time can be identified at the very beginning of the sub-batch (e.g., at the boundary between the given sub-batch and the previous sub-batch) if the signal sweep at the beginning of the sub-batch has a value that is higher than first threshold 302. In some embodiments, a pulse end-time can be identified at the very end of the sub-batch (e.g., at the boundary between the given sub-batch and the next sub-batch) if the signal sweep at the end of the sub-batch has a value that is higher than first threshold 302 or a value that is higher than second threshold 304 with no other pulse-end times between itself and a previous pulse start-time. This ensures that all portions of a pulse are correctly identified and ultimately coalesced even if the pulse extends beyond the sub-batch and into one or more adjacent sub-batches.

The start-time and end-time of a detected pulse may be stored in a data structure associated with the sub-batch that includes the pulse. The data structure for a given sub-batch may include start-times and end-times for many different pulses present within the sub-batch. According to some embodiments, the data structure includes one or more other fields that indicate whether the pulse start-time or end-time existed at a boundary of the sub-batch or a count of the total number of detected pulses in the sub-batch.

By leveraging the parallel processing capability of multiple threads in a GPU, pulse start-times and end-times can be detected and allow for the pulses to be sequentially stored in an output array using fewer processing steps than if the sub-batches were processed serially, according to an embodiment. Due to the way that the RF signal is chopped up into the different sub-batches, the pulse detection within each sub-batch has some special considerations to consider. For example, pulses may span a boundary between two sub-batches which could cause detection of two pulses (one from each sub-batch). Thus, in accordance with some embodiments, pulses must be resolved at the sub-batch boundaries based on the signal characteristics at and around the boundary. In some embodiments, pulses that start and end within a single sub-batch may be detected and stored separately (e.g., indexed separately in memory) from pulses that span across one or more boundaries between sub-batches.

Figure 4A:
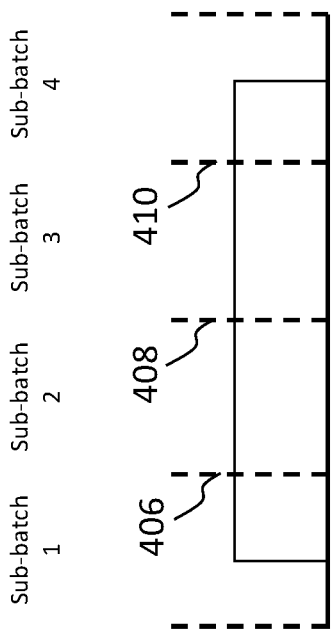
FIGS. 4A-4D illustrate pulse detection examples spanning across more than one subgroup, in accordance with an embodiment of the present disclosure.

FIGS. 4A-4D illustrate some example cases where a pulse spans between one or more sub-batch boundaries or begins at a sub-batch boundary, according to some embodiments. FIG. 4A illustrates two adjacent sub-batches having a sub-batch boundary 402 and a pulse 404 that spans across sub-batch boundary 402. Without any correction, each of the two sub-batches would identify having one pulse. In this example, since the signal level of the RF signal is above the first threshold (indicating a valid pulse) at the end of the first sub-batch and is also above the first threshold at the beginning of the second sub-batch, the pulse is identified as a single pulse spanning across the two sub-batches. Put another way, the first sub-batch has a pulse-end time at boundary 402 and the second sub-batch has a pulse-start time at the same boundary 402, meaning that the pulses from the two sub-batches are coalesced into a single pulse spanning across boundary 402, according to an embodiment. The single pulse start-time and end-time information may be stored in a data structure associated with the sub-batch where the first pulse-start time is located, which in this example is the first sub-batch. Accordingly, the second sub-batch may not include any pulse information.

Figure 4B:
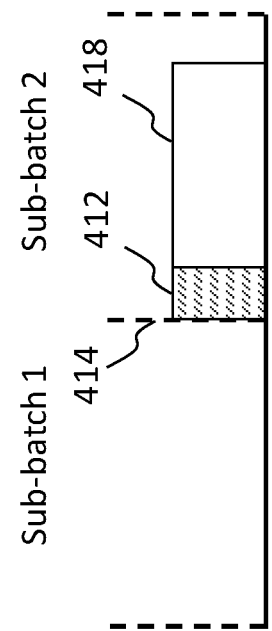

It is possible for a single pulse to span across more than one sub-batch. FIG. 4B illustrates four adjacent sub-batches with a pulse that spans across the boundaries between each of the four adjacent sub-batches. Without any correction, each of the four sub-batches would identify having one pulse. A similar process to that described for FIG. 4A may be performed at each boundary to determine that the pulse start-times and end-times from each of the four adjacent sub-batches should be coalesced into a single detected pulse, according to an embodiment. At each of boundaries 406, 408, and 410, the signal would be above the first threshold on either side of the given boundary, so the pulse is coalesced into a single pulse spanning across all three boundaries. The single pulse start-time and end-time information may be stored in a data structure associated with the sub-batch where the first pulse-start time is located, which in this example is the first sub-batch. Accordingly, the second, third, and fourth sub-batches may not include any pulse information.

Figure 4C:
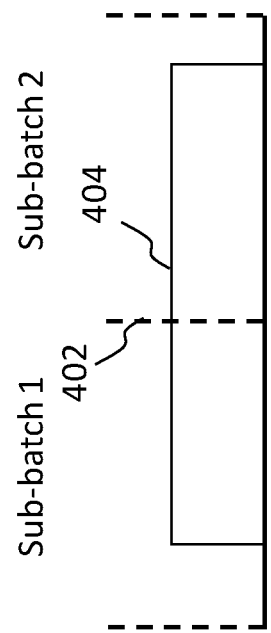

Due to the hysteresis nature of the pulse detection, it is possible that the RF signal level is between the first and second thresholds at the start of a sub-batch. In such a situation, it can be difficult to determine whether the signal should be part of a pulse or not. FIG. 4C illustrates an example where a signal portion 412 present at the beginning of the second sub-batch and at a boundary 414 between the first and second sub-batches is ambiguous as to whether it should be classified as part of a pulse. The signal may be ambiguous if it has a signal amplitude that is lower than the first threshold but higher than the second threshold (with reference to FIG. 3). According to an embodiment, the previous sub-batch is observed to identify whether it included a pulse-end time at boundary 414 (representing a pulse that spans across boundary 414). In this example, the previous sub-batch does include a pulse-end time at boundary 414, so the ambiguous signal portion 412 would be added to the previous pulse from the first sub-batch. In this example, the signal raises above the first threshold within the second sub-batch to be identified as a clear pulse 416. Since signal portion 412 has been coalesced with the pulse from the first sub-batch, clear pulse signal 416 would also be coalesced with signal portion 412, which would be detected as one continuous pulse that spans between the adjacent sub-batches. The single pulse start-time and end-time information may be stored in a data structure associated with the sub-batch where the first pulse-start time is located, which in this example is the first sub-batch. Accordingly, the second sub-batch may not include any pulse information.

Figure 4D:
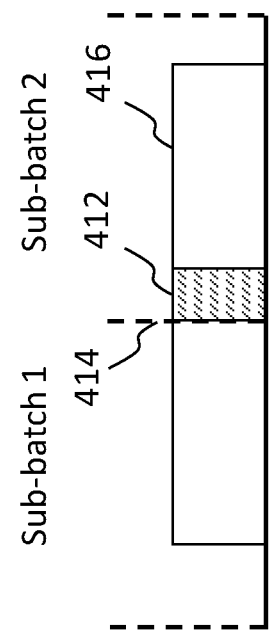

FIG. 4D illustrates another example where ambiguous signal portion 412 is present at the beginning of the second sub-batch and at a boundary 414 between the first and second sub-batches, but with no identified end-pulse time within the first sub-batch at boundary 414. It should be noted that the first-sub batch may have other identified pulses with no pulse-end time at boundary 414. Since there is no identified pulse-end time at boundary 414 from the previous sub-batch, signal portion 412 is discarded and is not identified as being part of a pulse. In this example, when the signal rises above the first threshold at a later time within the second sub-batch, a pulse 418 is detected that does not include signal portion 412. In this example, the first sub-batch would not include any pulse information and the second sub-batch would include a data structure having pulse information, such as the pulse start-time and end-time.

Figure 5:
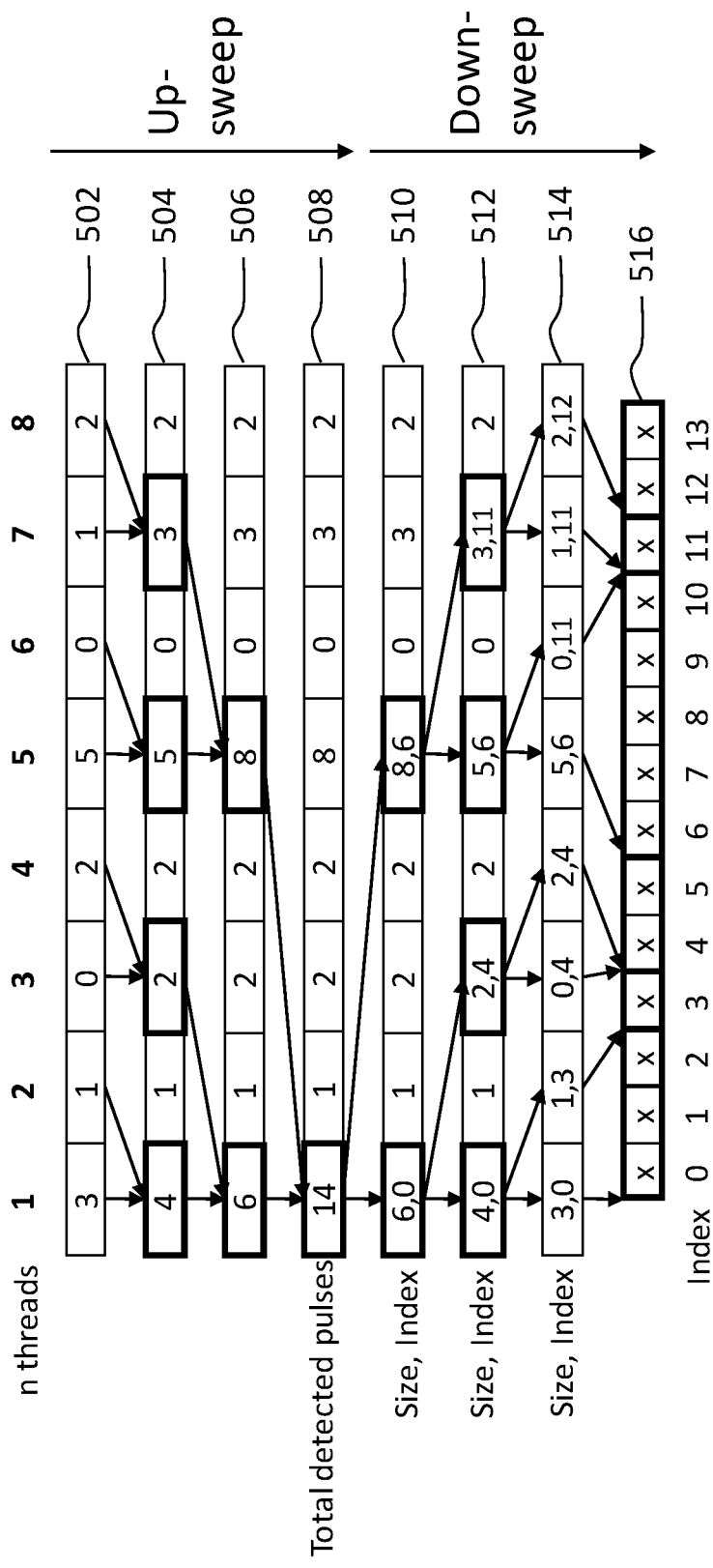
FIG. 5 illustrates a parallel processing method for pulse counting, in accordance with an embodiment of the present disclosure.

FIG. 5 illustrates an example of using a scan algorithm technique to detect pulses from a plurality of sub-batches and create an output vector for the pulses, according to some embodiments. In this example, each of the detected pulses is considered to be wholly contained within its sub-batch. In other words, none of the detected pulses in this example span across a boundary between sub-batches. Examples including pulses that do span across boundaries are discussed herein with reference to FIGS. 6A and 6B. A series of detection processes are performed during an up-sweep portion of the algorithm while a series of splitting processes to determine the locations to store the pulses in an array are performed during a down-sweep portion of the algorithm, according to an embodiment. It should be understood that the specific number of detected pulses and specific number of threads are used for this example only and that the technique may be applied to any number of GPU threads to add any number of pulses found within each sub-batch. Furthermore, it should be understood that the detection of a given pulse includes the detection of the start-time and end-time of the given pulse, according to an embodiment.

A plurality of sub-batches 502 each include a number of signal pulses identified within the given sub-batch. Plurality of sub-batches 502 combined is a single batch of data. According to an embodiment, each of the plurality of sub-batches is processed using a different thread from the GPU such that the total number of threads processed in parallel equals the total number of sub-batches in plurality of sub-batches 502. In this example, 8 threads are used to process 8 sub-batches and count the number of pulses within each sub-batch. As discussed previously, plurality of sub-batches 502 may represent a portion of the received RF signal having a particular frequency range.

According to an embodiment, a first processing iteration 504 involves combining the detected pulses within a plurality of subgroups from plurality of sub-batches 502 to provide a total number of detected pulses as illustrated by the bolded boxes. Each subgroup includes $2^n$ sub-batches where n equals the current detection iteration. For example, in this first processing iteration 504, n=1 and so each sub-group to have the detected pulse information combined includes 2 sub-batches. Accordingly, the first and second sub-batches, from threads 1 and 2, have their detected pulse information combined, the third and fourth sub-batches, from threads 3 and 4, have their detected pulse information combined, and so on for all sub-batches. Note that each of these detection operations performed during first processing iteration 504 are performed in parallel by the GPU threads, according to an embodiment.

According to an embodiment, a second processing iteration 506 performs a similar detection process, but with adding the pulse information from the previously provided combined pulses (in the bolded boxes) from first processing iteration 504 in groups of two. This effectively provides the combined pulse information for a plurality of subgroups each having four sub-batches (as $2^n$ with n=2 is 4). As shown in this example, second processing iteration 506 adds the information from the previous 4 detected pulses and 2 detected pulses to provide information for all 6 detected pulses. Similarly, second processing iteration 506 adds the information from the previous 5 detected pulses and 3 detected pulses to provide information for all 8 detected pulses. As with first processing iteration 504, each of the detection operations performed during second processing iteration 506 are performed in parallel by the GPU threads, according to an embodiment.

According to an embodiment, a third processing iteration 508 performs a similar detection process, but with adding the pulse information from the previously provided combined pulses (in the bolded boxes) from second processing iteration 506 in groups of two. In this example, the combined pulse information from the previous 6 detected pulses and 8 detected pulses are combined to provide information for all 14 detected pulses. Since this is the third detection iteration, the combined pulse information provided in third processing iteration 508 represents the combined pulse information for all detected pulses within a subgroup having all of the sub-batches (since $2^3$=8, the total number of sub-batches in this example). Accordingly, the summation iteration is complete. Thus, in this example, information from each of the detected pulses from 8 sub-batches was combined together using only three process iterations. The number of process iterations to detect all of the pulses changes depending on the total number of sub-batches being processed in parallel. In general, the detection of all of the pulses is performed over n process iterations where $2^n$ is equal to the total number of sub-batches being processed in parallel. Although FIG. 5 illustrates the coalesced pulse counts during each subsequent processing iteration, it should be understood that this is for illustrative purposes only and that any other pulse information can be coalesced as well.

Once the pulse information of all detected pulses is determined, an output array 516 is generated having an array size equal to the total number of detected pulses, which may be derived from the combined pulse information of all pulses from sub-batches 502, according to an embodiment. Output array 516 is ideally constructed to include temporally sequential pulses from the RF signal. In order to ensure that the pulses are arranged in the correct order, a splitting process is performed during a down-sweep portion of the scan algorithm. A series of splitting processes are performed to break the total number of detected pulses back into the detected pulses from each of the plurality of sub-batches along with an index value for each of the plurality of sub-batches. The index value of a given sub-batch represents a location in output array 516 to begin storing any of the pulses from the given sub-batch, according to an embodiment.

During a first splitting process 510, the total number of detected pulses is broken down back into its two previous numbers of detected pulses, along with an index value to designate where in the array to begin storing the pulses, according to an embodiment. In this example, the total number of detected pulses of 14 is split back into the previous numbers of 6 and 8, along with index values of 0 and 6, respectively. The first index value 0 represents the first location in the output array to begin storing the first six pulses. The second index value of 6 represents the seventh location in the output array to begin storing the next eight pulses, since the first six locations have been filled with the first six pulses. As with the detection process iterations, the operations of first splitting process 510 are performed in parallel by the GPU, according to an embodiment.

During a second splitting process 512, the number of detected pulses from the previous splitting process 510 are each broken down into their previous detected pulse numbers along with index values to designate where in the array to begin storing the pulses, according to an embodiment. In this example, the number of detected pulses of 6 is split back into the previous numbers of 4 and 2, along with index values of 0 and 4, respectively, while the number of detected pulses of 8 is split back into the previous numbers of 5 and 3, along with index values of 6 and 11, respectively. The operations of second splitting process 512 are performed in parallel by the GPU, according to an embodiment.

During a third splitting process 514, the number of detected pulses from the previous splitting process 512 are each broken down into their previous numbers along with index values to designate where in the array to begin storing the pulses, according to an embodiment. Splitting the number of detected pulses from the previous splitting process 512 yields the original number of detected pulses from each of the sub-batches, along with the final index values for storing the pulses in output array 516, according to an embodiment. The total number of splitting processes during the down-sweep portion of the scan algorithm is equal to the total number of detection processes during the up-sweep portion of the scan algorithm, according to an embodiment. The operations of third splitting process 514 are performed in parallel by the GPU, according to an embodiment.

According to some embodiments, the various GPU threads store data regarding the number of detected pulses (e.g., start times and end times for the detected pulses) for the given thread within shared memory used by other processing components as part of the RF detection system. Memory space may be allocated for the size of output array 516. Since it is possible for a pulse to span across two batches of data (e.g., between the last sub-batch of a first batch of data and the first sub-batch of an adjacent second batch of data), a pulse-end state at the last boundary of the last sub-group is maintained as an output of the first batch of data and serves as an input for the next batch of data to indicate that the pulse carries over into its first sub-batch, according to some embodiments.

Figure 6A:
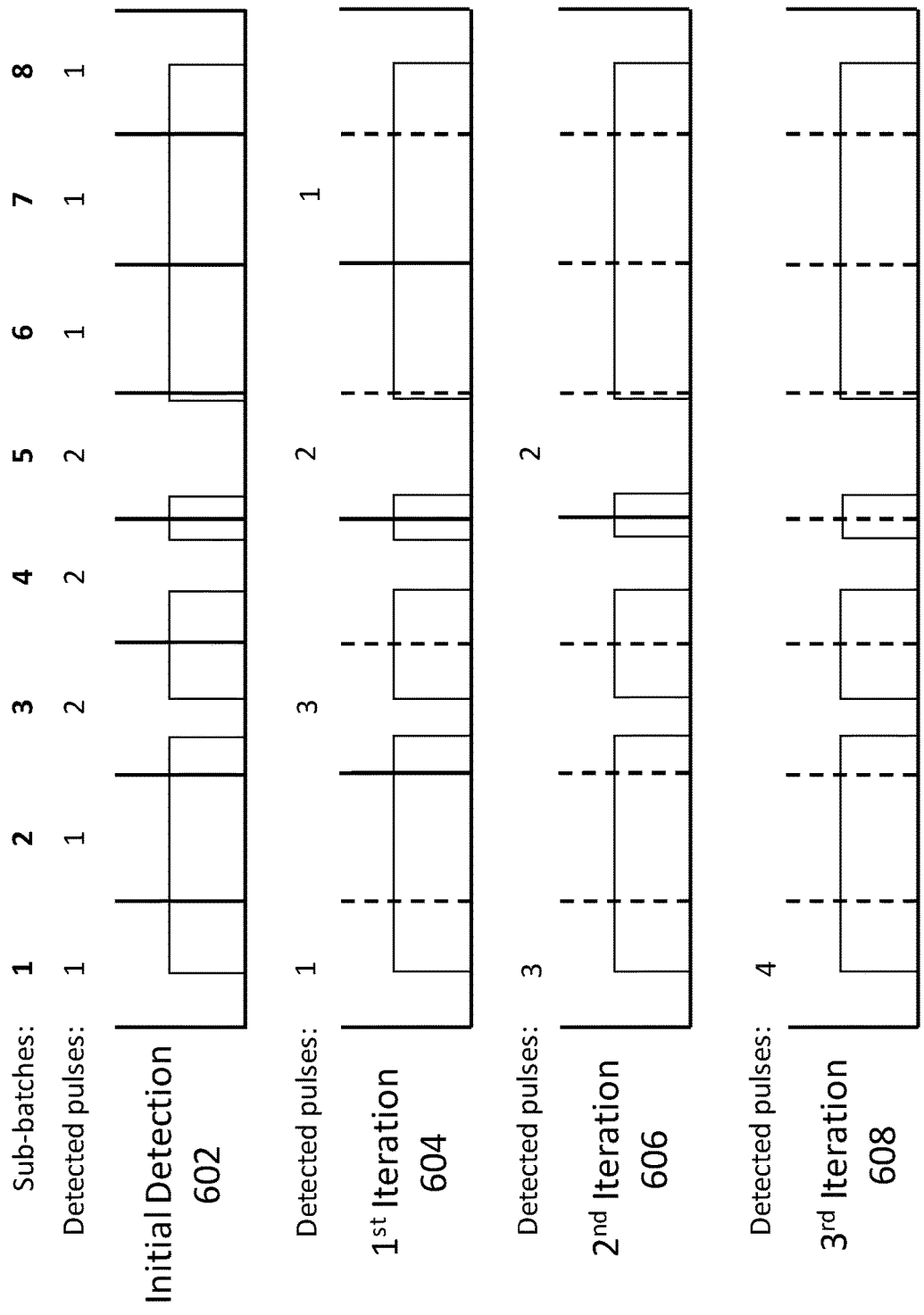
FIGS. 6A and 6B illustrate pulse counting procedures across multiple adjacent sub-batches, in accordance with some embodiments of the present disclosure.

FIG. 6A illustrates an example of pulse coalescing across multiple sub-batch summation iterations, in accordance with an embodiment. The number of sub-batches used and pulse shapes are provided as a single example only and it should be understood that the process discussed herein can be applied to any number of sub-batches containing any number and/or shape of pulses.

During an initial detection stage 602, pulses are identified (e.g., by their respective start-times and end-times) within a received batch of the RF signal across a plurality of sub-batches, according to an embodiment. The boundaries between adjacent sub-batches are shown as solid lines in initial detection stage 602. The number of detected pulses provided for each sub-batch at initial detection stage 602 may not be accurate if one or more of the pulses span across any of the sub-batch boundaries. In this example, the total number of pulses detected during initial detection stage 602 would be eleven even though there are actually only four pulses of varying duration. Accordingly, during subsequent summation iterations between the sub-batches, identified pulses are coalesced if they are found to span across one or more of the sub-batch boundaries.

During a first iteration 604, the detected pulses from pairs of sub-batches are combined together (e.g., each subgroup includes 2 sub-batches). Pulses within each sub-group are coalesced by determining whether a pulse spans across a boundary within the subgroup. In this example, the first subgroup identifies one pulse even though the sub-batches from the first subgroup previously identified two pulses because the two pulses are coalesced across the dotted line boundary between the sub-batches. Similarly, the second subgroup identifies three pulses even though the sub-batches from the second subgroup previously identified four pulses because two of those four pulses are coalesced across the dotted line boundary between the sub-batches. According to an embodiment, the pulse information would be stored in a data structure associated with the first sub-group of each of the sub-batches. For example, the pulse information for the detected pulse in the first subgroup would be stored in a data structure associated with the first sub-batch, the pulse information for the three detected pulses in the second subgroup would be stored in a data structure associated with the third sub-batch, the pulse information for the two detected pulses in the third subgroup would be stored in a data structure associated with the fifth sub-batch, and the pulse information for the detected pulse in the fourth sub-group would be stored in a data structure associated with the seventh sub-batch. In this example, the even sub-batches would not include any pulse information after first iteration 604, according to an embodiment.

During a second iteration 606, the subgroups are expanded by a factor of 2 to each now include four of the sub-batches, according to an embodiment. The detected pulses are combined from the previous subgroups and pulses are once again coalesced by determining whether any of them span across a boundary within the new subgroup. In this example, the first subgroup identifies three pulses even though the previous two subgroups (representing four sub-batches) identified four pulses because two of those four pulses are coalesced across another dotted line boundary between sub-batches. The same coalescing procedure occurs for the second subgroup during second iteration 606, according to an embodiment. According to an embodiment, the pulse information would be stored in a data structure associated with the first sub-group of each of the sub-batches. For example, the pulse information for the three pulses in the first subgroup would be stored in a data structure associated with the first sub-batch and the pulse information for the two pulses in the second subgroup would be stored in a data structure associated with the fifth sub-batch. All other sub-batches would not include any pulse information after second iteration 606, according to an embodiment.

During a third and final iteration 608, a single subgroup is formed (by expanding the previous subgroups by a factor of 2) that includes all of the sub-batches, according to an embodiment. The detected pulses are combined from the previous subgroups and pulses are once again coalesced by determining whether any of them span across a boundary within the new subgroup. In this example, the pulse spanning across the middle boundary (between fourth and fifth sub-groups) is coalesced into a single detected pulse. The final number of detected pulses is 4.

Figure 6B:
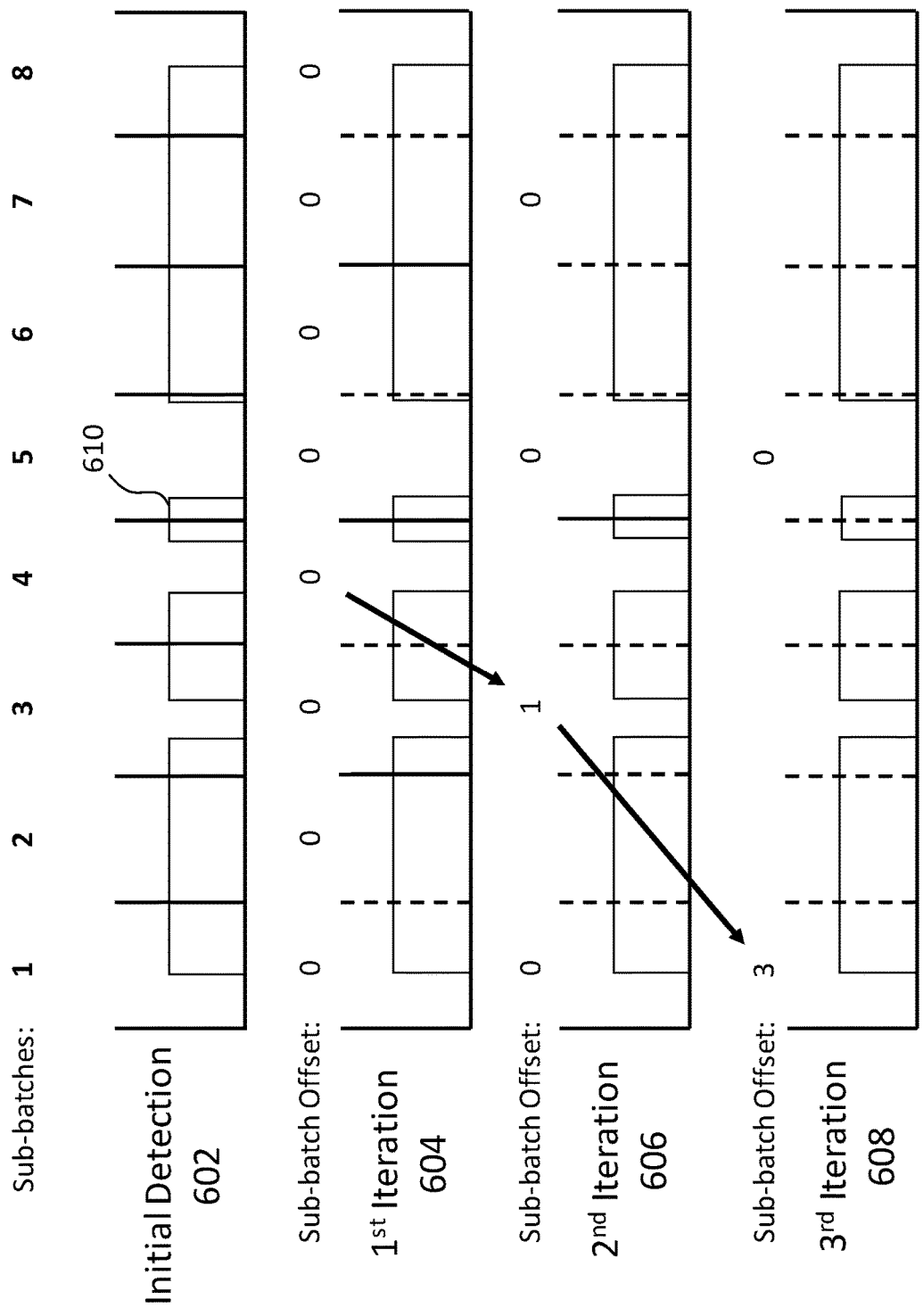

FIG. 6B illustrates the same pulse coalescing example from FIG. 6A across the three detection iterations, with emphasis on a pulse 610 that straddles the sub-batch boundary between the two-most central sub-batches, according to an embodiment. Because pulse 610 is not resolved and coalesced into a single pulse until the very last iteration, a record of the "incomplete" pulse from the fourth sub-batch may be maintained through each of the iterations. According to an embodiment, an offset value is maintained for pulse 610 to indicate the sub-batch (in this example, sub-batch 4) that includes the start of the incomplete pulse 610. As shown in FIG. 6B, during second iteration 606, an offset value of 1 is recorded for the second subgroup to indicate that there is an unresolved pulse in the next sub-batch from the sub-batch having the offset. During third iteration 608, the offset value is increased to 3 since it is now stored in the first sub-batch and the unresolved pulse is found in the sub-batch that is three away from the sub-batch holding the offset value. The final offset value can be used to determine where there is an unresolved pulse and to include that pulse in the final pulse detection for the current subgroup once it has been coalesced.

According to some embodiments, memory is set aside to store the working information for each sub-batch (e.g., the detected pulse information of each sub-batch). This memory may be located in the GPU shared memory. The data structures created in this memory to track the detected pulse information for each sub-batch are designed to track the pulse information even as the information is coalesced between sub-batches (e.g. during an up-sweep procedure).

An example data structure may include a plurality of fields (e.g., designed portions of memory) for storing different aspects of the pulse information for a given sub-batch. Each sub-batch may have its own data structure for tracking the pulse information. According to some embodiments, a data structure may include: a first field that stores start and stop pulse times (TStart$_{start}$ and TStart$_{stop}$) for pulses that are truncated at the start of the sub-batch; a second field for storing pulse start and end times (Tstop$_{start}$ and Tstop$_{stop}$) for pulses that are truncated at the end of the sub-batch; a third field (LocalPulseArray) for storing pulse start-times and end-times for pulses that are entirely local to the sub-batch; a fourth field (Count) that stores a count of the total number of detected pulses in the sub-batch; a fifth field (Offset) that stores offset data of the sub-batch to be stored at the conclusion of the coalescing; a sixth field (SubBatchOffset) for storing offset data that references a sub-batch having unresolved information; and a seventh field (State) that tracks the current state of the sub-batch.

According to an embodiment, when pulses are first being detected across a plurality of sub-batches (before any coalescing has occurred), pulse information is stored in the appropriate field of the data structure depending on the characteristics of the detected pulse. For example, pulse start-times and end-times for pulses detected wholly within one sub-batch are stored in the LocalPulseArray field. In another example, if a sub-batch has a pulse truncated at its start, then the pulse stop-time will be recorded in TStart$_{Stop}$. If this is the first sub-batch and there is a carried over pulse from the previous batch, it will be stored in TStart$_{Start}$. In some examples, TStart$_{Start}$ records the first pulse start-time that is above the upper signal threshold (e.g., first signal threshold 302). The State field may record if TStart$_{Start}$ is used and what it is used for. In another example, if a sub-batch has a pulse truncated at its stop, then the stop boundary of the sub-batch will be temporarily considered the pulse-end time. In this case, the pulse-start time is recorded in TStop$_{Start}$ and the pulse-end time is recorded in TStop$_{Stop}$. The State field may record if the TStop variables are being used. In another example, if a pulse spans the entire width of the sub-batch, then the pulse-start and pulse-end information is recorded in the TStart variables and the State records that this pulse is a Whole Pulse. During the initial pulse detection phase, the Count field may record the total number of pulses recorded in the LocalPulseArray field and any pulses having times stored as the TStart and TStop variables, according to an embodiment. During the initial pulse detection phase, both the Offset and SubBatchOffset fields may be set to zero to be used during later pulse detection stages.

After the pulses are initially detected from the sub-batches, a series of detection iterations are performed to stride through the sub-batches in powers of 2 with each iteration and coalesce the pulse information from the various sub-batches, as discussed above with reference to FIGS. 5, 6A, and 6B. As this occurs, the pulse information is coalesced between the sub-batches. For example, when two neighboring sub-batches are coalesced their state, TStart, and TStop data get coalesced. In some embodiments, the pulse-stop time of a pulse that spans multiple sub-batches is stored in the sub-batch where it started (e.g., the sub-batch that contains its pulse-start time). The count field may also need to be adjusted if a pulse winds up being deleted or accounted for in a different sub-batch. Some example states for a sub-batch with respect to coalescing are No Truncation, Truncated Start, Truncated Stop, Truncated Start and Stop, and Whole Pulse. These states describe the state of one or more of the pulses within the sub-batch, according to an embodiment. After all of the coalescing is performed, there should be no truncated pulses except if a pulse is truncated at the end of the entire batch in which case its information will be forwarded to the next batch. When two sub-batches are coalesced, the first sub-batch assumes the state of the union of the two sub-batches, according to an embodiment. The new boundaries of this conceptual sub-group (e.g., combined sub-batches) are the start of the first sub-batch and the end of the second.

According to an embodiment, as the sub-batches are being coalesced, some of the truncated pulses (e.g., those pulses that spanned across sub-batch boundaries) are resolved and recorded in the data structures. For example, in cases where the first sub-batch has a Truncated Stop state and the second sub-batch has a Truncated Start state or a Whole Pulse state, then TStop$_{Stop}$ of the first sub-batch is updated to the TStart$_{Stop}$ of the second sub-batch. In another example, in cases where the first sub-batch has a Whole Pulse state and the second sub-batch has a Truncated Start state or a Whole Pulse state, then TStart$_{Stop}$ of the first sub-batch is updated to the TStart$_{Stop}$ of the second sub-batch. Additionally, if a backup pulse-start time is present in the second sub-batch and not the first, then TStart$_{Start}$ of the first sub-batch is updated to the TStart$_{Start}$ of the second sub-batch, according to an embodiment. In another example, in cases where a pulse's truncated edge of a sub-batch is not matched by a pulse's truncated edge of an adjoining sub-batch, the pulse records are resolved in-place such that a Truncated Start TStart$_{Start}$ becomes the pulse-start time if a backup index is present, otherwise this pulse is deleted, and for a Truncated Stop, the pulse start and stop times remain the same and only the state changes. In another example, if the second sub-batch has a Truncated Stop state and the corresponding pulse-start time is not in the first sub-batch, then the SubBatchOffset field is incremented relative to the number of coalescing iterations performed so far such that when the Truncated Stop state is resolved, the pulse-stop time will be recorded in the correct sub-batch.

After each of the coalescing iterations are performed, the Count and Offset fields can be computed through another scan algorithm iteration, according to an embodiment. Afterwards, the output of each sub-batch can be written in parallel to the correct offset in a final output array. Each sub-batch may write any data stored in the TStart, LocalPulseArray, and TStop fields of its data structure, if present, to produce a final output array that is time ordered, according to an embodiment.

Methodology

Figure 7:
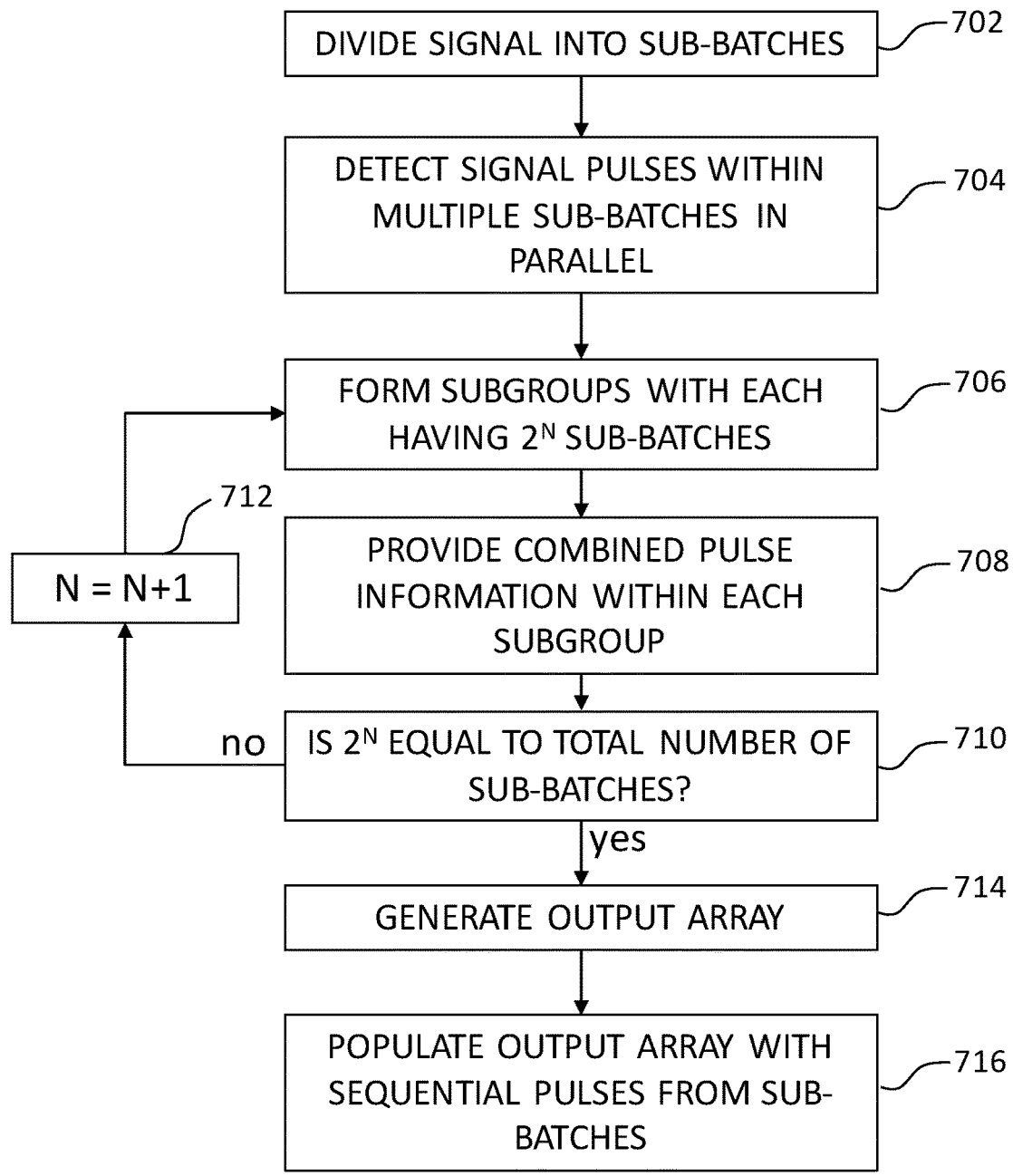
FIG. 7 is a flowchart of a method for determining a number of pulses in a received radio frequency (RF) signal, in accordance with an embodiment of the present disclosure.

FIG. 7 illustrates an example method 700 for detecting pulses of a received signal, in accordance with certain embodiments of the present disclosure. As can be seen, the example method includes a number of phases and sub-processes, the sequence of which may vary from one embodiment to another. However, when considered in the aggregate, these phases and sub-processes form a process for detecting within a signal batch using a scan algorithm as described above, for example, with reference to FIGS. 3-6. The method may be implemented on the system architecture described with reference to FIG. 2, however other system architectures can be used in other embodiments, as will be apparent in light of this disclosure. To this end, the correlation of the various functions shown in FIG. 7 to the specific components illustrated in the other figures is not intended to imply any structural and/or use limitations. Numerous variations and alternative configurations will be apparent in light of this disclosure.

Method 700 begins with operation 702 where a received signal is divided into a plurality of sub-batches, according to an embodiment. The received signal may be a signal batch having a duration in the millisecond range (e.g., between 1 ms and 1000 ms). In some embodiments, the RF signal is channelized into different frequency bins such that the received signal batch only include portions of the RF signal having a particular frequency range. The received signal batch may be an analog signal, however, in some embodiments, the received signal is a digital signal converted from a received RF signal.

The signal batch may be divided into any number of sub-batches each having the same duration. According to an embodiment, each of the signal sub-batches is processed using a different thread of one or more GPUs in parallel. A sub-batch signal may have a duration in the microsecond range (e.g., between 1 µs and 1000 µs).

Method 700 continues with operation 704 where signal pulses are detected within each of the sub-batches in parallel using one or more GPUs, according to an embodiment. Any number of signal pulses can be detected within each of the sub-batches, as discussed above. Signal pulses are detected by identifying a pulse-start time and a subsequent pulse-end time, even if the pulse-end time is determined to be at the boundary of the sub-batch (e.g., if the pulse spans across the boundary), according to some embodiments.

Method 700 continues with operation 706 where subgroups are formed with each subgroup having $2^N$ sub-batches (N starts at 1). Accordingly, during the first iteration, N=1 and each subgroup contains 2 sub-batches. Each subgroup contains different sub-batches and every sub-batch of the plurality of sub-batches is a member of only one subgroup, according to an embodiment.

Method 700 continues with operation 708 where information from the detected pulses within each subgroup is combined, according to an embodiment. The combined pulse information within a given subgroup may be provided by combining the detected pulse information from the sub-batches within the given subgroup. In another embodiment, the combined pulse information within a given subgroup is provided by combining the detected pulse information of the previous subgroups that were combined to form the given subgroup. In some embodiments, combining pulse information includes combining start-time and end-time data to identify different pulse locations.

Method 700 continues with operation 710 where a determination is made whether $2^N$ is equal to the total number of sub-batches. In other words, a determination is made whether all of the sub-batches are within a single subgroup. If $2^N$ does not equal the total number of sub-batches, then more detection iterations are required to detect all of the different pulses across all sub-batches and method 700 continues with operation 712 where N is increased by 1 to represent the next detection iteration. Then, operations 706 and 708 are repeated using fewer, larger subgroups (e.g. twice as large as during the previous summation iteration).

If at operation 710, $2^N$ does equal the total number of sub-batches, then the most recently determined combined pulse information from operation 708 includes information from all detected pulses, according to an embodiment. In this case, method 700 continues with operation 714 where an output array is generated having a size equal to the total number of detected pulses, according to an embodiment.

Method 700 continues with operation 716 where the output array is populated with sequential pulses from the plurality of sub-batches, according to an embodiment. In order to ensure that pulses are stored in the correct sequence, the detected pulses from the various sub-batches may be indexed to indicate where in the output array to begin storing the pulses of the given sub-batch. The index values may be determined in a down-sweep procedure described in more detail with reference to FIG. 5.

Example Communications Device

Figure 8:
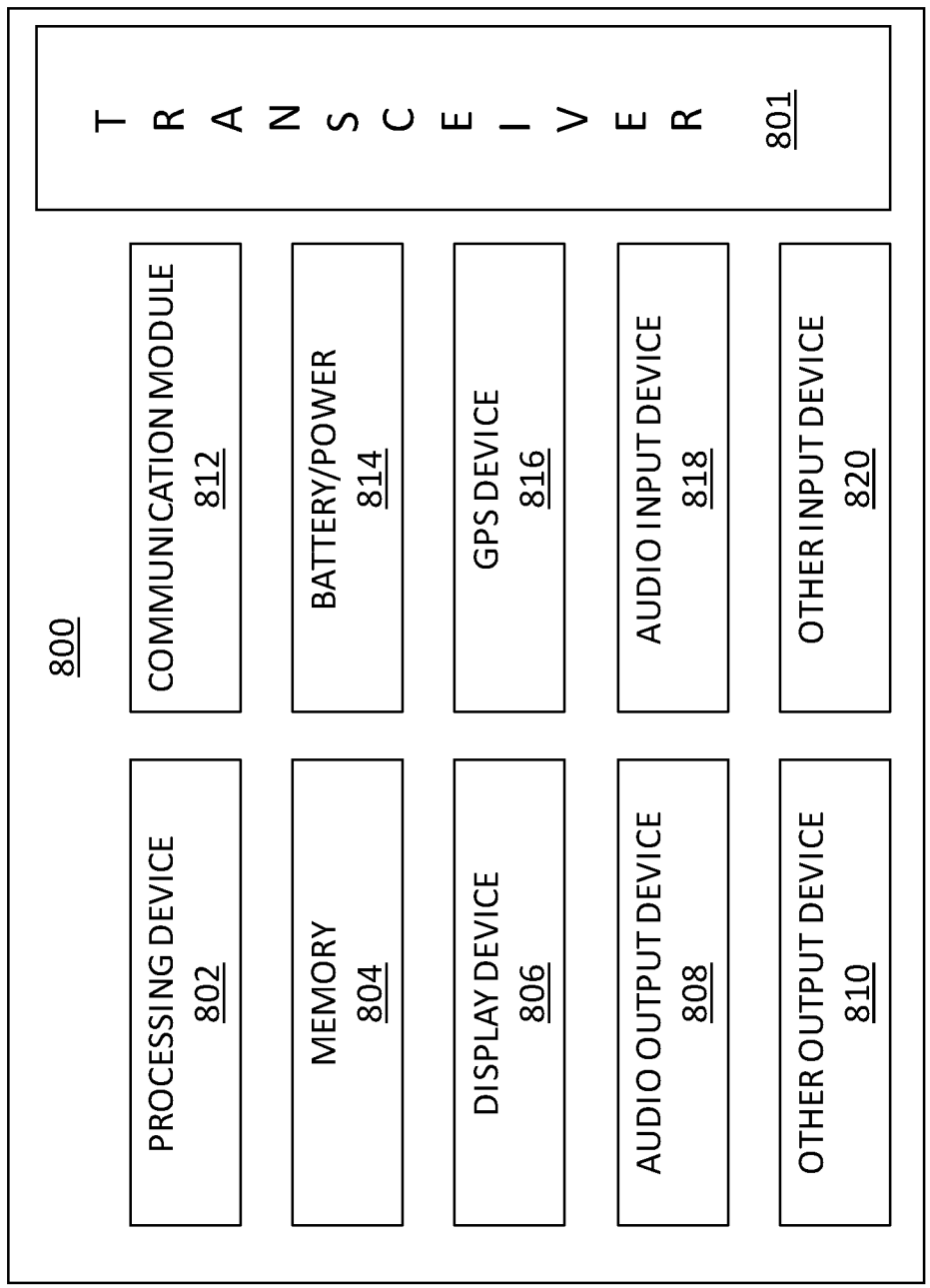
FIG. 8 illustrates a block diagram of an example communication device that may include a wide-band transceiver, in accordance with an embodiment of the present disclosure.

FIG. 8 is a block diagram of an example communication device 800 that may include a wideband receiver, or transceiver, that includes an RF front end circuitry in accordance with any of the embodiments disclosed herein. Accordingly, signals received via transceiver 801 may be digitized and signal pulses from the received signal may be identified. In one example, communication device 800 includes transceiver 801 having antenna 202 and RF front end circuitry 204 for receiving wideband GHz-level signals. Other frequency bands may be used as well, depending on the application. Several components are illustrated in FIG. 8 as included in the communication device 800, but any one or more of these components may be omitted or duplicated, as suitable for the application. In some embodiments, some or all of the components included in the communication device 800 may be attached to one or more motherboards. In some embodiments, some or all of these components are fabricated onto a single SIP.

Additionally, in various embodiments, communication device 800 may not include one or more of the components illustrated in FIG. 8, but communication device 800 may include interface circuitry for coupling to the one or more components. For example, communication device 800 may not include a display device 806, but may include display device interface circuitry (e.g., a connector and driver circuitry) to which display device 806 may be coupled. In another set of examples, communication device 800 may not include an audio input device 818 or an audio output device 808 but may include audio input or output device interface circuitry (e.g., connectors and supporting circuitry) to which audio input device 818 or audio output device 808 may be coupled.

Communication device 800 may include a processing device 802 (e.g., one or more processing devices). As used herein, the term "processing device" or "processor" may refer to any device or portion of a device that processes electronic data from registers and/or memory to transform that electronic data into other electronic data that may be stored in registers and/or memory. Processing device 802 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. In some embodiments, processing device 802 is designed to process portions of the received signal in parallel to identify and organize signal pulses in each of the portions of the received signal. Communication device 800 may include a memory 804, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, memory 804 may include memory that shares a die with processing device 802. This memory may be used as cache memory and may include embedded dynamic random access memory (eDRAM) or spin transfer torque magnetic random access memory (STT-MRAM).

In some embodiments, communication device 800 may include a communication module 812 (e.g., one or more communication modules). For example, communication module 812 may be configured for managing wireless communications for the transfer of data to and from communication device 800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

Communication module 812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), LTE project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. Communication module 812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. Communication module 812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication module 812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication module 812 may operate in accordance with other wireless protocols in other embodiments. Communication device 800 may include transceiver 801 to facilitate wireless communications and/or to receive other wireless communications (such as AM or FM radio transmissions).

In some embodiments, communication module 812 may manage wired communications, such as electrical, optical, or any other suitable communication protocols (e.g., the Ethernet). As noted above, communication module 812 may include multiple communication modules. For instance, a first communication module may be dedicated to shorter-range wireless communications such as Wi-Fi or Bluetooth, and a second communication module may be dedicated to longer-range wireless communications such as global positioning system (GPS), EDGE, GPRS, CDMA, WiMAX, LTE, EV-DO, or others. In some embodiments, the first communication module may be dedicated to wireless communications, and the second communication module may be dedicated to wired communications.

Communication device 800 may include battery/power circuitry 814. Battery/power circuitry 814 may include one or more energy storage devices (e.g., batteries or capacitors) and/or circuitry for coupling components of communication device 800 to an energy source separate from communication device 800 (e.g., AC line power).

Communication device 800 may include a display device 806 (or corresponding interface circuitry, as discussed above). Display device 806 may include any visual indicators, such as a heads-up display, a computer monitor, a projector, a touchscreen display, a liquid crystal display (LCD), a light-emitting diode display, or a flat panel display.

Communication device 800 may include an audio output device 808 (or corresponding interface circuitry, as discussed above). Audio output device 808 may include any device that generates an audible indicator, such as speakers, headsets, or earbuds.

Communication device 800 may include audio input device 818 (or corresponding interface circuitry, as discussed above). Audio input device 818 may include any device that generates a signal representative of a sound, such as microphones, microphone arrays, or digital instruments (e.g., instruments having a musical instrument digital interface (MIDI) output).

Communication device 800 may include a GPS device 816 (or corresponding interface circuitry, as discussed above). GPS device 816 may be in communication with a satellite-based system and may receive a location of communication device 800, as known in the art.

Communication device 800 may include an other output device 810 (or corresponding interface circuitry, as discussed above). Examples of other output device 810 may include an audio codec, a video codec, a printer, a wired or wireless transmitter for providing information to other devices, or an additional storage device.

Communication device 800 may include an other input device 820 (or corresponding interface circuitry, as discussed above). Examples of other input device 820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

Communication device 800 may have any desired form factor, such as a handheld or mobile communication device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop communication device, a server or other networked computing component, a printer, a scanner, a monitor, a set-top box, an entertainment control unit, a vehicle control unit, a digital camera, a digital video recorder, or a wearable communication device. In some embodiments, the communication device 800 may be any other electronic device that processes data.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

FURTHER EXAMPLE EMBODIMENTS

The following examples pertain to further embodiments, from which numerous permutations and configurations will be apparent.

Example 1 is a processor-implemented method for detecting pulses in a received signal. The method includes dividing the received signal into a plurality of sub-batches, wherein each of the plurality of sub-batches represents a different temporal portion of the received signal; processing each of the plurality of sub-batches in parallel, wherein the processing comprises detecting a number of pulses present within each of the plurality of sub-batches, wherein each of the detected pulses is characterized as having pulse information; combining detected pulse information of the detected pulses from the plurality of sub-batches; and generating an output array having a size based on a total combined pulse count derived from the combined detected pulse information from the plurality of sub-batches, the output array comprising sequential pulses from the plurality of sub-batches. Combining the detected pulse information includes providing combined information on a number of detected pulses within one or more subgroups, wherein each subgroup includes $2^n$ sub-batches, with n equal to a number of iterations of performing the providing; and repeating the providing, increasing n by 1 for each iteration, until $2^n$ is equal to a total number of sub-batches in the plurality of sub-batches.

Example 2 includes the subject matter of Example 1, further comprising splitting the total combined pulse count back into the number of detected pulses from each of the plurality of sub-batches along with an index value for each of the plurality of sub-batches, the index value of a given sub-batch representing a location in the output array to begin storing any of the pulses from the given sub-batch.

Example 3 includes the subject matter of Example 1 or 2, wherein detecting a number of pulses within a given sub-batch comprises: determining a pulse-start time and a pulse-end time in the given sub-batch; and classifying the time between the pulse-start time and the pulse-end time as one detected pulse, wherein the time between the pulse-start time and the pulse-end time contains no other pulse-start times or pulse-end times.

Example 4 includes the subject matter of Example 3, wherein determining a pulse-start time comprises determining that an amplitude of the received signal at the pulse-start time raises above a first threshold, and wherein determining a pulse-end time comprises determining that an amplitude of the received signal at the pulse-end time lowers below a second threshold different from the first threshold.

Example 5 includes the subject matter of Example 4, wherein the first threshold is greater than the second threshold.

Example 6 includes the subject matter of Example 4 or 5, wherein determining a pulse-start time further comprises determining that an amplitude of the received signal is above the first threshold at the beginning of the given sub-batch and determining a pulse-end time further comprises determining that an amplitude of the received signal is either above the first threshold at the end of the given sub-batch or is above the second threshold at the end of the given sub-batch with no other pulse-end times between it and a previous pulse start-time.

Example 7 includes the subject matter of any one of Examples 1-6, wherein combining detected pulse information from the plurality of sub-batches further comprises combining a detected pulse from a first sub-batch and a detected pulse from a second neighboring sub-batch into a single detected pulse.

Example 8 includes the subject matter of Example 7, wherein the single detected pulse spans temporally across a boundary between the first sub-batch and the second neighboring sub-batch.

Example 9 is a system designed to detect pulses in a received signal. The system includes one or more non-transitory machine-readable mediums configured to store instructions; an analog-to-digital converter (ADC) configured to convert the received signal into a digital signal; and one or more processors configured to execute the instructions stored on the one or more non-transitory machine-readable mediums. Execution of the instructions causes the one or more processors to divide the digital signal into a plurality of sub-batches, wherein each of the plurality of sub-batches represents a different temporal portion of the digital signal; process each of the plurality of sub-batches in parallel by detecting a number of pulses present within each of the plurality of sub-batches, wherein each of the detected pulses is characterized as having pulse information; combine detected pulse information of the detected pulses from the plurality of sub-batches; and generate an output array having a size based on a total combined pulse count derived from the combined detected pulse information from the plurality of sub-batches. The output array comprises sequential pulses from the plurality of sub-batches. The combining of detected pulse information includes providing combined information on a number of detected pulses within one or more subgroups, wherein each subgroup includes $2^n$ sub-batches, with n equal to a number of iterations of performing the providing; and repeating the providing, increasing n by 1 for each iteration, until $2^n$ is equal to a total number of sub-batches in the plurality of sub-batches.

Example 10 includes the subject matter of Example 9, wherein execution of the instructions further causes the one or more processors to split the total combined pulse count back into the number of detected pulses from each of the plurality of sub-batches along with an index value for each of the plurality of sub-batches, the index value of a given sub-batch representing a location in the output array to begin storing any of the pulses from the given sub-batch.

Example 11 includes the subject matter of Example 9 or 10, wherein counting a number of pulses within a given sub-batch comprises: determining a pulse-start time and a pulse-end time in the given sub-batch; and classifying the time between the pulse-start time and the pulse-end time as one detected pulse, wherein the time between the pulse-start time and the pulse-end time contains no other pulse-start times or pulse-end times.

Example 12 includes the subject matter of Example 11, wherein determining a pulse-start time comprises determining that an amplitude of the digital signal at the pulse-start time raises above a first threshold, and wherein determining a pulse-end time comprises determining that an amplitude of the digital signal at the pulse-end time lowers below a second threshold different from the first threshold.

Example 13 includes the subject matter of Example 12, wherein the first threshold is greater than the second threshold.

Example 14 includes the subject matter of Example 12 or 13, wherein determining a pulse-start time further comprises determining that an amplitude of the digital signal is above the first threshold at the beginning of the given sub-batch and determining a pulse-end time further comprises determining that an amplitude of the digital signal is either above the first threshold at the end of the given sub-batch or is above the second threshold at the end of the given sub-batch with no other pulse-end times between it and a previous pulse start-time.

Example 15 includes the subject matter of any one of Examples 9-14, wherein combining detected pulse information from the plurality of sub-batches further comprises combining a detected pulse from a first sub-batch and a detected pulse from a second neighboring sub-batch into a single detected pulse.

Example 16 includes the subject matter of Example 15, wherein the single detected pulse spans temporally across a boundary between the first sub-batch and the second neighboring sub-batch.

Example 17 is a computer program product having one or more non-transitory machine-readable mediums encoding instructions that when executed by one or more processors cause a process to be carried out for detecting pulses in a received signal. The process includes dividing the received signal into a plurality of sub-batches, wherein each of the plurality of sub-batches represents a different temporal portion of the received signal; processing each of the plurality of sub-batches in parallel, wherein the processing comprises detecting a number of pulses present within each of the plurality of sub-batches, wherein each of the detected pulses is characterized as having pulse information; combining detected pulse information of the detected pulses from the plurality of sub-batches; and generating an output array having a size based on a total combined pulse count derived from the combined detected pulse information from the plurality of sub-batches, the output array comprising sequential pulses from the plurality of sub-batches. Combining the detected pulse information includes providing combined information on a number of detected pulses within one or more subgroups, wherein each subgroup includes $2^n$ sub-batches, with n equal to a number of iterations of performing the providing; and repeating the providing, increasing n by 1 for each iteration, until $2^n$ is equal to a total number of sub-batches in the plurality of sub-batches.

Example 18 includes the subject matter of Example 17, wherein the process further comprises splitting the total combined pulse count back into the number of detected pulses from each of the plurality of sub-batches along with an index value for each of the plurality of sub-batches, the index value of a given sub-batch representing a location in the output array to begin storing any of the pulses from the given sub-batch.

Example 19 includes the subject matter of Example 17 or 18, wherein counting a number of pulses within a given sub-batch comprises: determining a pulse-start time and a pulse-end time in the given sub-batch; and classifying the time between the pulse-start time and the pulse-end time as one detected pulse, wherein the time between the pulse-start time and the pulse-end time contains no other pulse-start times or pulse-end times.

Example 20 includes the subject matter of Example 19, wherein determining a pulse-start time comprises determining that an amplitude of the received signal at the pulse-start time raises above a first threshold, and wherein determining a pulse-end time comprises determining that an amplitude of the digital signal at the pulse-end time lowers below a second threshold different from the first threshold.

Example 21 includes the subject matter of Example 20, wherein the first threshold is greater than the second threshold.

Example 22 includes the subject matter of Example 20 or 21, wherein determining a pulse-start time further comprises determining that an amplitude of the received signal is above the first threshold at the beginning of the given sub-batch and determining a pulse-end time further comprises determining that an amplitude of the digital signal is either above the first threshold at the end of the given sub-batch or is above the second threshold at the end of the given sub-batch with no other pulse-end times between it and a previous pulse start-time.

Example 23 includes the subject matter of any one of Examples 17-22, wherein combining detected pulse information from the plurality of sub-batches further comprises combining a detected pulse from a first sub-batch and a detected pulse from a second neighboring sub-batch into a single detected pulse.

Example 24 includes the subject matter of Example 23, wherein the single detected pulse spans temporally across a boundary between the first sub-batch and the second neighboring sub-batch.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A processor-implemented method for detecting pulses in a received signal, the method comprising:
   dividing the received signal into a plurality of sub-batches, wherein each of the plurality of sub-batches represents a different temporal portion of the received signal;
   processing each of the plurality of sub-batches in parallel, wherein the processing comprises detecting a number of pulses present within each of the plurality of sub-batches, wherein each of the detected pulses is characterized as having pulse information;
   combining detected pulse information of the detected pulses from the plurality of sub-batches, wherein the combining comprises
      providing combined information on a number of detected pulses within one or more subgroups, wherein each subgroup includes $2^n$ sub-batches, with n equal to a number of iterations of performing the providing; and
      repeating the providing, increasing n by 1 for each iteration, until $2^n$ is equal to a total number of sub-batches in the plurality of sub-batches; and
   generating an output array having a size based on a total combined pulse count derived from the combined detected pulse information from the plurality of sub-batches, the output array comprising sequential pulses from the plurality of sub-batches.

2. The processor-implemented method of claim 1, further comprising splitting the total combined pulse count back into the number of detected pulses from each of the plurality of sub-batches along with an index value for each of the plurality of sub-batches, the index value of a given sub-batch representing a location in the output array to begin storing any of the pulses from the given sub-batch.

3. The processor-implemented method of claim 1, wherein detecting a number of pulses within a given sub-batch comprises:
   determining a pulse-start time and a pulse-end time in the given sub-batch; and
   classifying the time between the pulse-start time and the pulse-end time as one detected pulse, wherein the time between the pulse-start time and the pulse-end time contains no other pulse-start times or pulse-end times.

4. The processor-implemented method of claim 3, wherein determining a pulse-start time comprises determining that an amplitude of the received signal at the pulse-start time raises above a first threshold, and wherein determining a pulse-end time comprises determining that an amplitude of the received signal at the pulse-end time lowers below a second threshold different from the first threshold.

5. The processor-implemented method of claim 4, wherein determining a pulse-start time further comprises determining that an amplitude of the received signal is above the first threshold at the beginning of the given sub-batch and determining a pulse-end time further comprises determining that an amplitude of the received signal is either above the first threshold at the end of the given sub-batch or is above the second threshold at the end of the given sub-batch with no other pulse-end times between it and a previous pulse start-time.

6. The processor-implemented method of claim 1, wherein combining detected pulse information from the plurality of sub-batches further comprises combining a detected pulse from a first sub-batch and a detected pulse from a second neighboring sub-batch into a single detected pulse.

7. The processor-implemented method of claim 6, wherein the single detected pulse spans temporally across a boundary between the first sub-batch and the second neighboring sub-batch.

8. A system configured to detect pulses in a received signal, the system comprising:
   one or more non-transitory machine-readable mediums configured to store instructions;
   an analog-to-digital converter (ADC) configured to convert the received signal into a digital signal; and
   one or more processors configured to execute the instructions stored on the one or more non-transitory machine-readable mediums, wherein execution of the instructions causes the one or more processors to
      divide the digital signal into a plurality of sub-batches, wherein each of the plurality of sub-batches represents a different temporal portion of the digital signal;
      process each of the plurality of sub-batches in parallel by detecting a number of pulses present within each of the plurality of sub-batches, wherein each of the detected pulses is characterized as having pulse information;
      combine detected pulse information of the detected pulses from the plurality of sub-batches, wherein the combining comprises:
         providing combined information on a number of detected pulses within one or more subgroups, wherein each subgroup includes $2^n$ sub-batches, with n equal to a number of iterations of performing the providing; and
         repeating the providing, increasing n by 1 for each iteration, until $2^n$ is equal to a total number of sub-batches in the plurality of sub-batches; and
      generate an output array having a size based on a total combined pulse count derived from the combined detected pulse information from the plurality of sub-batches, the output array comprising sequential pulses from the plurality of sub-batches.

9. The system of claim 8, wherein execution of the instructions further causes the one or more processors to split the total combined pulse count back into the number of detected pulses from each of the plurality of sub-batches along with an index value for each of the plurality of sub-batches, the index value of a given sub-batch representing a location in the output array to begin storing any of the pulses from the given sub-batch.

10. The system of claim 8, wherein counting a number of pulses within a given sub-batch comprises:
determining a pulse-start time and a pulse-end time in the given sub-batch; and
classifying the time between the pulse-start time and the pulse-end time as one detected pulse, wherein the time between the pulse-start time and the pulse-end time contains no other pulse-start times or pulse-end times.

11. The system of claim 10, wherein determining a pulse-start time comprises determining that an amplitude of the digital signal at the pulse-start time raises above a first threshold, and wherein determining a pulse-end time comprises determining that an amplitude of the digital signal at the pulse-end time lowers below a second threshold different from the first threshold.

12. The system of claim 11, wherein determining a pulse-start time further comprises determining that an amplitude of the digital signal is above the first threshold at the beginning of the given sub-batch and determining a pulse-end time further comprises determining that an amplitude of the digital signal is either above the first threshold at the end of the given sub-batch or is above the second threshold at the end of the given sub-batch with no other pulse-end times between it and a previous pulse start-time.

13. The system of claim 8, wherein combining detected pulse information from the plurality of sub-batches further comprises combining a detected pulse from a first sub-batch and a detected pulse from a second neighboring sub-batch into a single detected pulse.

14. The system of claim 13, wherein the single detected pulse spans temporally across a boundary between the first sub-batch and the second neighboring sub-batch.

15. A computer program product including one or more non-transitory machine-readable mediums encoding instructions that when executed by one or more processors cause a process to be carried out for detecting pulses in a received signal, the process comprising:
dividing the received signal into a plurality of sub-batches, wherein each of the plurality of sub-batches represents a different temporal portion of the received signal;
processing each of the plurality of sub-batches in parallel, wherein the processing comprises detecting a number of pulses present within each of the plurality of sub-batches, wherein each of the detected pulses is characterized as having pulse information;
combining detected pulse information of the detected pulses from the plurality of sub-batches, wherein the combining comprises
providing combined information on a number of detected pulses within a plurality of subgroups, wherein each subgroup includes $2^n$ sub-batches, with n equal to a number of iterations of performing the providing; and
repeating the providing, increasing n by 1 for each iteration, until $2^n$ is equal to a total number of sub-batches in the plurality of sub-batches; and
generating an output array having a size based on a total combined pulse count derived from the combined detected pulse information from the plurality of sub-batches, the output array comprising sequential pulses from the plurality of sub-batches.

16. The computer program product of claim 15, wherein the process further comprises splitting the total combined pulse count back into the number of detected pulses from each of the plurality of sub-batches along with an index value for each of the plurality of sub-batches, the index value of a given sub-batch representing a location in the output array to begin storing any of the pulses from the given sub-batch.

17. The computer program product of claim 15, wherein counting a number of pulses within a given sub-batch comprises:
determining a pulse-start time and a pulse-end time in the given sub-batch; and
classifying the time between the pulse-start time and the pulse-end time as one detected pulse, wherein the time between the pulse-start time and the pulse-end time contains no other pulse-start times or pulse-end times.

18. The computer program product of claim 17, wherein determining a pulse-start time comprises determining that an amplitude of the received signal at the pulse-start time raises above a first threshold, and wherein determining a pulse-end time comprises determining that an amplitude of the digital signal at the pulse-end time lowers below a second threshold different from the first threshold.

19. The computer program product of claim 18, wherein determining a pulse-start time further comprises determining that an amplitude of the received signal is above the first threshold at the beginning of the given sub-batch and determining a pulse-end time further comprises determining that an amplitude of the digital signal is either above the first threshold at the end of the given sub-batch or is above the second threshold at the end of the given sub-batch with no other pulse-end times between it and a previous pulse start-time.

20. The computer program product of claim 15, wherein combining detected pulse information from the plurality of sub-batches further comprises combining a detected pulse from a first sub-batch and a detected pulse from a second neighboring sub-batch into a single detected pulse.

* * * * *